United States Patent
Konishi

(10) Patent No.: US 8,178,462 B2
(45) Date of Patent: May 15, 2012

(54) METHOD FOR PRODUCTION OF ELECTRODE CATALYST FOR FUEL CELL

(75) Inventor: Shigeru Konishi, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 12/681,223

(22) PCT Filed: Aug. 13, 2008

(86) PCT No.: PCT/JP2008/064522
§ 371 (c)(1),
(2), (4) Date: Apr. 1, 2010

(87) PCT Pub. No.: WO2009/044587
PCT Pub. Date: Apr. 9, 2009

(65) Prior Publication Data
US 2010/0222206 A1    Sep. 2, 2010

(30) Foreign Application Priority Data
Oct. 5, 2007    (JP) .................................. 2007-261810

(51) Int. Cl.
H01M 4/88    (2006.01)
H01M 4/02    (2006.01)
H01M 4/36    (2006.01)
H01M 4/92    (2006.01)
H01M 4/90    (2006.01)
H01M 4/62    (2006.01)
B01J 21/18    (2006.01)
B01J 23/00    (2006.01)
B01J 23/40    (2006.01)
B01J 23/74    (2006.01)

(52) U.S. Cl. ........ 502/101; 502/182; 502/185; 429/524; 429/526; 429/532

(58) Field of Classification Search .................. 502/101, 502/182, 185; 429/524, 526, 532
See application file for complete search history.

(56) References Cited

U.S. PATENT DOCUMENTS

| | | | | |
|---|---|---|---|---|
| 4,407,905 A | * | 10/1983 | Takeuchi et al. | 429/524 |
| 5,795,669 A | * | 8/1998 | Wilkinson et al. | 429/412 |
| 6,066,410 A | * | 5/2000 | Auer et al. | 429/481 |
| 6,326,098 B1 | * | 12/2001 | Itoh et al. | 429/483 |
| 6,518,217 B2 | * | 2/2003 | Xing et al. | 502/230 |
| 6,670,301 B2 | * | 12/2003 | Adzic et al. | 502/185 |
| 7,022,642 B2 | * | 4/2006 | Yamamoto | 502/185 |
| 7,345,005 B2 | * | 3/2008 | Kourtakis | 502/182 |
| 7,488,699 B2 | * | 2/2009 | Huang et al. | 502/182 |
| 7,589,043 B2 | * | 9/2009 | Yoo et al. | 502/180 |
| 7,867,940 B2 | * | 1/2011 | Pak et al. | 502/159 |
| 2002/0015878 A1 | | 2/2002 | Tsumura et al. | |
| 2004/0127347 A1 | * | 7/2004 | Lee et al. | 502/101 |
| 2005/0075240 A1 | | 4/2005 | Yamamoto | |
| 2006/0093892 A1 | | 5/2006 | Min et al. | |
| 2007/0218342 A1 | * | 9/2007 | Han et al. | 429/40 |
| 2010/0048387 A1 | | 2/2010 | Zhang et al. | |
| 2010/0048388 A1 | * | 2/2010 | Konishi | 502/101 |

FOREIGN PATENT DOCUMENTS

| | | |
|---|---|---|
| JP | 4 141233 | 5/1992 |
| JP | 2002-093423 | * 3/2002 |
| JP | 2002 100374 | 4/2002 |
| JP | 2005 135900 | 5/2005 |
| JP | 2006 128117 | 5/2006 |
| JP | 2006 205088 | 8/2006 |
| JP | 2007 134295 | 5/2007 |
| WO | 2008 120515 | 10/2008 |

OTHER PUBLICATIONS

Kawaguchi, et al., "Catalyst", 94th CATSJ Meeting Abstracts: No. 1 A 11, vol. 46, No. 6, pp. 417-419 (2004).

* cited by examiner

*Primary Examiner* — Patricia L Hailey
(74) *Attorney, Agent, or Firm* — Oblon, Spivak, McClelland, Maier & Neustadt, L.L.P.

(57) ABSTRACT

Disclosed is a method for producing an electrode catalyst for a fuel cell, which comprises a Ru-containing metal microparticle supported on an electrically conductive carbon carrier, wherein $M_2RuX_6$ [M=at least one member selected from H, Li, Na, K and $NH_4$; X=at least one member selected from Cl, Br, I and $NO_3$] is used as a precursor of Ru. It becomes possible to produce an electrode catalyst for a fuel cell, which is improved in the methanol oxidation activity per mass or surface area of the catalyst compared with a conventional Pt- and Ru-carrying carbon catalyst prepared by using a Ru raw material having an average valency of 3.

19 Claims, No Drawings

METHOD FOR PRODUCTION OF ELECTRODE CATALYST FOR FUEL CELL

TECHNICAL FIELD

This invention relates to a method for producing an electrode catalyst suited for fuel cells and especially for direct methanol fuel cells.

BACKGROUND ART

For mobile phones, batteries with a higher capacity are desired, but it is quite difficult to increase the capacity of secondary batteries. Thus direct methanol fuel cells (DMFC) using methanol fuel become of greater interest.

DMFC has advantages such as possible size reduction since they can utilize liquid fuel directly without converting it into hydrogen or the like. Research efforts have been made thereon toward commercial use. However, the problems that the electrolyte membrane has a high methanol permeability and the anode catalyst has a low methanol oxidation activity arrest the commercial application of DMFC.

Most often PtRu base catalysts are used as the anode catalyst. Due to their low methanol oxidation activity, PtRu catalysts must be used in large amounts, typically of about 3 to 10 mg/cm$^2$. As the amount of PtRu catalyst increases, the catalyst layer becomes substantially thicker. For this reason, PtRu black catalyst is typically used to facilitate diffusion of methanol as the fuel. However, the PtRu black catalyst has such a particle size of at least 5 nm that they have a low methanol oxidation activity per catalyst mass and a high fraction of PtRu not contributing to catalytic reaction. It is thus preferred to use a catalyst having a good distribution of smaller PtRu particles loaded on a conductive carbon support. It is also desirable to maximize the amount of PtRu particles supported on carbon in order to minimize the thickness of a catalyst layer.

Making extensive investigations to attain the above object, the inventor found that when a process of forming metal nuclei such as Pt on support carbon, then growing PtRu on the metal nuclei (to be referred to as two-stage loading process, hereinafter) is used as means for producing a highly loaded/highly dispersed PtRu-laden catalyst, there is obtainable a catalyst in which PtRu particles having an average particle size of up to 4 nm are loaded on carbon in a well dispersed fashion even at a loading of at least 50% by mass (Patent Document 1: JP-A 2007-134295). This two-stage loading process yields a catalyst having a methanol oxidation activity 2.5 times higher than the commercially available catalyst TEC61E54 (Tanaka Kikinzoku Group). However, a further improvement in methanol oxidation activity is desired so that the catalyst may find commercial application.

Means contemplated for improving methanol oxidation activity include further atomization of catalyst particles and enhancement of catalyst activity per unit surface area. For example, a study is made on the catalyst composition, for example, addition of a third metal such as Rh or Ir besides PtRu (Non-Patent Document 1: Kawaguchi et al., Catalyst 46 (6), 417-419, 2004). The catalysts under study have a loading as low as 30% by mass while a catalyst activity corresponding to a practical loading, for example, of at least 50% by mass is unknown.

There is a desire for a further improvement in methanol oxidation activity of a catalyst having a maximum loading independent of whether the improvement resorts to the extension of surface area or the increase in activity per unit surface area or both.

Patent Document 1: JP-A 2007-134295
Non-Patent Document 1: Kawaguchi et al., Catalyst 46 (6), 417-419, 2004

DISCLOSURE OF THE INVENTION

Problem to be Solved by the Invention

An object of the invention which has been made under the above-discussed circumstances is to provide a method for producing an electrode catalyst having a high methanol oxidation activity despite a high loading, suited for fuel cells and especially for direct methanol fuel cells (DMFC).

Means for Solving the Problem

Making extensive investigations to attain the above object, the inventor has found that if in the above-referred two-stage loading process including formation of metal nuclei on support carbon and growth of PtRu, the Ru reagent used during the growth of PtRu is a ruthenic acid chloride salt whose ruthenium has a nominal valence of 4, that is, $M_2RuCl_6$ wherein M=H, Li, Na, K or $NH_3$, then methanol oxidation activity per PtRu surface area and methanol oxidation activity per PtRu mass are improved, specifically at a potential of 0.4 to 0.6 V vs RHE, as compared with the ruthenium reagents used thus far whose ruthenium has a nominal valence of 3. Particularly when the Ru reagent used is $H_2RuCl_6$, the methanol oxidation activity is most improved. The present invention is predicated on this finding.

Accordingly, the invention provides a method for producing an electrode catalyst for fuel cells, as defined below.

[1] A method for producing an electrode catalyst for fuel cells, the catalyst having ruthenium-containing metal nano-particles loaded on an electroconductive carbon support, characterized in that $M_2RuX_6$ is used as a ruthenium precursor wherein M is at least one member selected from the group consisting of H, Li, Na, K and $NH_4$ and X is at least one member selected from the group consisting of Cl, Br, I and $NO_3$.

[2] A method for producing an electrode catalyst for fuel cells, comprising a first loading step of forming metal nano-particles on an electroconductive carbon support, the metal nano-particles having a particle size of 0.1 to 2.0 nm and a controlled spacing therebetween, and a second loading step of growing a metal containing at least ruthenium on the metal nano-particles as nuclei, characterized in that $M_2RuX_6$ is used as a ruthenium reagent in the second loading step wherein M is at least one member selected from the group consisting of H, Li, Na, K and $NH_4$ and X is at least one member selected from the group consisting of Cl, Br, I and $NO_3$.

[3] A method for producing an electrode catalyst for fuel cells, comprising a first loading step of forming metal nano-particles on an electroconductive carbon support, the metal nano-particles having a particle size of 0.1 to 2.0 nm and a controlled spacing therebetween, and a second loading step of growing a metal containing at least ruthenium on the metal nano-particles as nuclei, characterized in that $H_2RuCl_6$ is used as a ruthenium reagent in the second loading step.

[4] A method for producing an electrode catalyst for fuel cells according to [2] or [3], wherein the metal grown in the second loading step comprises platinum and ruthenium.

Advantageous Effects of Invention

The method of the invention is successful in producing a fuel cell electrode catalyst having improved methanol oxidation activities per catalyst mass and per catalyst surface area, as compared with the conventional PtRu-loaded carbon catalysts prepared using Ru reagents whose Ru has a nominal valence of 3.

BEST MODE FOR CARRYING OUT THE INVENTION

The method for producing an electrode catalyst for fuel cells according to the invention is a two-stage loading process comprising
(i) a first loading step of providing metal nano-particles on an electroconductive carbon support by an immersion technique, the metal nano-particles having a particle size of 0.1 to 2.0 nm and a controlled spacing therebetween, and
(ii) a second loading step of growing nano-particles of another metal on the metal nano-particles as nuclei.

Examples of the conductive carbon support which can be used in the first loading step include acetylene black, furnace black, channel black, activated carbon, graphite, carbon nanotubes, carbon nanofibers, and carbon nanocoils. The conductive carbon support preferably have an average primary particle size of 10 to 200 nm, and more preferably 10 to 50 nm. With an average particle size of less than 10 nm, it may be difficult in some cases to uniformly disperse the carbon and have metal nano-particles with an average particle size of up to 1.5 nm loaded thereon. If the average primary particle size is more than 200 nm, the amount of metal per unit volume is reduced, raising the risk that a catalyst layer must be thicker in order to incorporate a predetermined amount of catalyst in a fuel cell during its fabrication, and such a thick catalyst layer may interfere with effective fuel supply. It is noted herein that the average primary particle size may be determined by taking a photographic image of ×2,000,000 magnification under a transmission electron microscope (TEM), measuring diameters of about 300 particles and computing an average thereof.

Examples of the metal to be loaded on the carbon support include Pt, Au, Ag, Ir, Os, Pd, Rh, Ru, Cu, Ni, Co, Fe, Mn, Cr, V, Ti, Mo, W, Ta, Bi, Sn, etc. Inter alia, Pt or Ru is preferred because a higher active surface area is available from a loading of the same mass. The metal is provided and loaded as nano-particles having an average particle size of 0.1 to 2.0 nm on the carbon support at a controlled spacing between particles. As used herein, the term "a controlled spacing between nano-particles" means that nano-particles are uniformly dispersed on carbon surfaces without agglomeration. The means for controlling the spacing between nano-particles may be by chemically reducing a metal source in a liquid phase in the presence of carbon at a loading of less than 30% by mass, preferably up to 15% by mass, or by impregnating carbon with a metal source at a loading of less than 30% by mass, preferably up to 15% by mass, followed by chemical reduction in a gas phase, or by loading metal colloid on carbon at a loading of less than 30% by mass, preferably up to 15% by mass.

Also, nucleation by metal nano-particles in the first loading step is limited to a particle size of up to 2.0 nm as described above. With a particle size of more than 2.0 nm, the catalyst particles finally produced have a large particle size and tend to agglomerate, failing to provide a highly dispersed catalyst. Formation to a particle size of up to 2.0 nm ensures firm bond to the support and uniform dispersion on carbon.

The means for forming and loading metal nano-particles in the first loading step is as follows. In a specific embodiment wherein platinum nano-particles are formed and loaded in a liquid phase in the presence of carbon, a platinum compound and a reducing agent are added to a dispersion of the carbon support in water in a concentration of 0.01 to 2% by mass, more specifically 0.1 to 1% by mass, with exemplary platinum compounds including chloroplatinic acid salts, platinum (II) chloride, platinum(IV) chloride, dinitrodiamineplatinum (II), bisacetylacetonatoplatinum, dichlorotetramineplatinum, platinum tetraminesulfate, ammonium platinum(II) chloride, ammonium platinum(IV) chloride, dichlorodiamineplatinum, etc., and exemplary reducing agents including ethylene glycol, ethanol, methanol, n-propanol, i-propanol, butanol, etc. The amount of the platinum compound used in this embodiment is preferably 0.1 to 30% by mass, more preferably 1 to 15% by mass of platinum metal based on the carbon support. If the amount of platinum compound is too small, less nuclei may grow on the carbon surface. If the amount of platinum compound is too large, coarse particles may develop, failing to produce a highly dispersed catalyst having a high loading. The amount of the reducing agent such as ethylene glycol used in this embodiment is preferably 1 to 80% by mass, more preferably 5 to 50% by mass of the water dispersion. The water dispersion is preferably at pH 4 to 12, more preferably pH 5 to 10. Then a pH adjustor such as sodium hydroxide, aqueous ammonia or tetrahydroxymethylammonium may be used for adjustment to the desired pH range.

Next, preferably the liquid mixture thus obtained is stirred at 40 to 120° C., more preferably 50 to 100° C. for 1 to 10 hours, more preferably 2 to 6 hours, followed by filtration, washing, and drying at 40 to 150° C., more preferably 60 to 120° C. for 3 to 24 hours, more preferably 8 to 16 hours.

At the end of chemical reduction, a loading of metal nano-particles is preferably 1 to 30% by mass, more preferably 5 to 15% by mass. With too low a loading, an insufficient number of nuclei grow on the carbon surface. With too high a loading, metal particles may become larger in size, failing to produce a highly dispersed catalyst having a high loading. Note that the loading is determined by the following equation.

$$\text{Loading(mass \%)} = [A/(A+C)] \times 100$$

A: mass of metal nano-particles
C: mass of carbon support

Once metal nano-particles are loaded on the carbon support as described above, another metal (catalytic metal) is grown on the metal nano-particles serving as nuclei. Suitable catalytic metals used herein are ruthenium-containing metals, especially PtRu-containing metals, and include platinum-ruthenium (PtRu) binary systems, and ternary systems such as PtRuSn, PtRuRh, PtRuPd, PtRuIr, PtRuAu, PtRuMo, PtRuW, PtRuCo, PtRuNi, PtRuFe, and PtRuCr, with PtRu being preferred for high methanol oxidation activity.

By loading and growing the catalytic metal such as PtRu on the nano-particle nuclei of Pt or the like created in the first step, a highly loaded, highly dispersed catalyst is obtainable. The finally deposited catalytic metal such as PtRu has an average particle size of up to 4 nm, preferably up to 3 nm, and more preferably up to 2 nm. The lower limit of particle size is not critical and is usually at least 0.1 nm. A particle size in excess of 4 nm, which is equivalent to or more than the particle size of the commercial catalyst TEC61E54, may lead to a lowering of methanol oxidation activity per metal mass.

A loading is desirably at least 50% by mass, more desirably at least 60% by mass. If the loading is less than 50% by mass, which allows minute PtRu particles to be readily dispersed, the catalyst layer formed in the preparation of a membrane-electrode assembly (MEA) becomes thicker than when highly loaded catalysts are used. Then the feed of methanol fuel becomes rate determinative, sometimes resulting in a low output as compared with the use of highly loaded catalysts.

The upper limit of loading is not critical and is often preferably up to 90% by mass, more preferably up to 70% by mass. Note that the loading is determined by the following equation.

Loading(mass %)=[(A+B)/(A+B+C)]×100

A: mass of metal nuclei
B: mass of catalytic metal (e.g., PtRu)
C: mass of carbon support For the growth of the metal catalyst on the metal nano-particle nuclei, for example, for the growth of PtRu, a platinum compound may be used as the platinum reagent, such as chloroplatinic acid, platinum(II) chloride, platinum(IV) chloride, dinitrodiamineplatinum(II), bisacetylacetonatoplatinum, dichlorotetramineplatinum, platinum tetraminesulfate, ammonium platinum(II) chloride, ammonium platinum(IV) chloride, and dichlorodiamineplatinum, alone or in admixture.

According to the invention, a ruthenium compound whose ruthenium has a nominal valence of 4, represented by the following formula, is used as the ruthenium reagent.

$$M_2RuX_6$$

Herein M is at least one member selected from the group consisting of H, Li, Na, K and $NH_4$ and X is at least one member selected from the group consisting of Cl, Br, I and $NO_3$.

Examples of the ruthenium reagent which can be used herein include ruthenium compounds whose ruthenium has a nominal valence of 4, such as ruthenic acid chloride ($H_2RuCl_6$), lithium ruthenate chloride ($Li_2RuCl_6$), sodium ruthenate chloride ($Na_2RuCl_6$), potassium ruthenate chloride ($K_2RuCl_6$), ammonium ruthenate chloride (($NH_4)_2RuCl_6$), alone or in admixture. Of these, $H_2RuCl_6$ is preferred because the final catalyst obtained therefrom has a high methanol oxidation activity.

These platinum and ruthenium compounds are dissolved in a solution of a reducing agent such as ethanol, methanol, n-propanol, i-propanol, butanol or ethylene glycol. Next the carbon support having metal nano-particle nuclei loaded thereon is admitted into the solution whereupon reaction runs at 40 to 120° C., specifically 50 to 100° C., for 1 to 10 hours, specifically 2 to 8 hours. Then PtRu nano-particles are created and grown on the metal nano-particle nuclei.

The platinum and ruthenium compounds are preferably used in such amounts that a molar ratio of platinum metal to ruthenium metal may range from 2:8 to 9:1, more preferably from 5:5 to 8:2. If the amount of the platinum compound is too small, C—H dissociation reaction of methanol may be retarded, resulting in a methanol oxidation current value being reduced. If the amount of the platinum compound is too large, oxidation reaction of CO which is the intermediate reaction product of methanol is unlikely to occur, leading to a lower methanol oxidation activity at a low potential (lower than or equal to 0.4 V vs RHE). If the amount of the ruthenium compound is too small, there may result a lower methanol oxidation activity at a low potential as in the case of excess platinum. If the amount of the ruthenium compound is too large, there may result a lower methanol oxidation current value as in the case of short platinum.

The carbon support having the metal nano-particle nuclei loaded thereon is preferably dispersed in the solution in a concentration of 0.01 to 2% by mass, more preferably 0.1 to 1% by mass. If the amount of the carbon support is too small, the amount of the resulting catalyst is reduced. If the amount of the carbon support is too large, it becomes difficult to disperse the carbon, which gives rise to such problems as agglomeration of metal particles and formation of coarse particles.

The fuel cell electrode catalyst thus obtained is advantageously used as the anode catalyst in DMFC.

EXAMPLE

Examples and Comparative Examples are given below for illustrating the invention, but the invention is not limited thereto.

Example 1

To 500 ml of a water dispersion containing 1 g of carbon support (Ketjen Black EC300J), chloroplatinic acid containing 0.1 g of platinum was added, and 500 g of ethylene glycol and 50 mmol of NaOH further added. The liquid mixture was heated and stirred at 80° C. for 16 hours. Subsequent filtration, washing and drying at 80° C. for 16 hours yielded Pt nuclei-laden carbon.

A TEM image of the Pt nuclei-laden carbon was taken to ascertain that nano-particles having a particle size of about 0.5 nm were uniformly dispersed on the support.

The Pt nuclei-laden carbon, 0.5 g, was admitted into 600 g of a solution containing 1.1 g of dinitrodiamineplatinum(II), 0.5 g of ruthenic acid chloride ($H_2RuCl_6$), and 100 g of ethanol. The solution was heated under reflux at 80° C. for 8 hours, yielding 1.4 g of a catalyst having a PtRu loading of 68% by mass. A TEM observation revealed that the PtRu particles having an average particle size of 2.4 nm were uniformly dispersed on carbon.

Evaluation of active surface area was by the CO stripping method. A test electrode was manufactured by ultrasonically dispersing the catalyst in water, adding dropwise the dispersion onto a glassy carbon electrode, drying, and adding dropwise 5% Nafion solution (by DuPont) thereto. The electrode was attached to a potentiostat HZ5000 (Hokuto Denko Co., Ltd.) and immersed in an electrolytic cell containing 0.5 M of $H_2SO_4$. The atmosphere of the electrolytic cell was purged with Ar, after which with the catalyst held at −0.18 V (vs RHE), CO gas was bubbled for 20 minutes for CO adsorption. With the catalyst held at the same potential, Ar gas was bubbled for 20 minutes for expelling excess CO gas. Thereafter, a CO stripping voltammogram was measured by potential sweeping over a potential range of −0.18 to 0.5 V (vs RHE) at a sweep rate of 10 mV/s, and potential sweeping was performed again after desorption of CO. Provided that an area difference is a CO oxidation current flow and the CO oxidation has a Coulomb charge of 4.2 C/m², an active surface area of PtRu was computed.

Methanol oxidation activity was evaluated by potential sweeping in an electrolytic solution containing 0.5 M of $H_2SO_4$ and 1 M of $CH_3OH$, over a potential range of −0.18 to 0.5 V (vs RHE) at a sweep rate of 1 mV/s and measuring an oxidation current flow. The evaluations of active area and methanol oxidation activity were both performed at 25° C.

Example 2

The Pt nuclei-laden carbon prepared by the same procedure as in Example 1, 0.5 g, was admitted into 600 g of a solution containing 1.1 g of dinitrodiamineplatinum(II), 0.7 g of potassium ruthenate chloride ($K_2RuCl_6$), and 100 g of ethanol. The solution was heated under reflux at 80° C. for 8 hours, yielding 1.4 g of a catalyst having a PtRu loading of 68% by mass. A TEM observation revealed that the PtRu particles having an average particle size of 2.4 nm were uniformly dispersed on carbon.

Comparative Example 1

The Pt nuclei-laden carbon prepared by the same procedure as in Example 1, 0.5 g, was admitted into 600 g of a solution containing 1.1 g of dinitrodiamineplatinum(II), 0.5 g of ruthenium chloride ($RuCl_3$) whose ruthenium has a valence of 3 as the ruthenium reagent, and 100 g of ethanol. The solution was heated under reflux at 80° C. for 8 hours, yielding 1.4 g of a catalyst having a PtRu loading of 68% by mass. A TEM observation revealed that the PtRu particles having an average particle size of 2.4 nm were uniformly dispersed on carbon.

Comparative Example 2

The Pt nuclei-laden carbon prepared by the same procedure as in Example 1, 0.5 g, was admitted into 600 g of a solution containing 1.1 g of dinitrodiamineplatinum(II), 0.7 g of ruthenium nitrate ($Ru(NO_3)_3$) whose ruthenium has a valence of 3, and 100 g of ethanol. The solution was heated under reflux at 80° C. for 8 hours, yielding 1.4 g of a catalyst having a PtRu loading of 68% by mass. A TEM observation revealed that the PtRu particles having an average particle size of 2.4 nm were uniformly dispersed on carbon.

For the catalysts in Examples 1 and 2 and Comparative Examples 1 and 2, the test results of active surface area and methanol oxidation activity at 0.4 V and 0.5 V (vs RHE) are shown in Table 1.

TABLE 1

| | Average particle size (nm) | Active surface area ($m^2$/g-PtRu) | Methanol oxidation activity per mass (A/g-PtRu) | | Methanol oxidation activity per surface area ($A/m^2$-PtRu) | |
|---|---|---|---|---|---|---|
| | | | 0.4 V vs RHE | 0.5 V vs RHE | 0.4 V vs RHE | 0.5 V vs RHE |
| Example 1 | 3.5 | 74 | 9.57 | 69.6 | 0.13 | 0.94 |
| Example 2 | 3.9 | 70 | 6.38 | 52.5 | 0.09 | 0.75 |
| Comparative Example 1 | 2.8 | 85 | 3.50 | 38.3 | 0.04 | 0.45 |
| Comparative Example 2 | 2.5 | 90 | 4.08 | 44.9 | 0.05 | 0.50 |

The catalysts obtained in Examples 1 and 2 had PtRu particles with a greater average particle size than the catalysts obtained in Comparative Examples 1 and 2, but a methanol oxidation activity per surface area which is 2 or 3 times greater than that of the catalysts obtained in Comparative Examples 1 and 2. Since the activity per surface area is improved beyond the offset by a reduction of active surface area, the methanol oxidation current value per PtRu mass is also increased. This demonstrates that a better catalyst activity is available from a reagent whose ruthenium has a nominal valence of 4 than from a reagent whose ruthenium has a nominal valence of 3. Particularly in Example 1 using $H_2RuCl_6$ as the Ru reagent, an outstanding increase of methanol oxidation activity was recorded.

The invention claimed is:

1. A method for producing an electrode catalyst for fuel cells, comprising a first loading step of forming metal nano-particles on an electroconductive carbon support, the metal nano-particles having a particle size of 0.1 to 2.0 nm and a controlled spacing therebetween, and a second loading step of growing metals comprising at least platinum and ruthenium from a solution comprising a platinum compound, a ruthenium compound and a reducing agent on the metal nano-particles as nuclei wherein
$M_2RuX_6$ is used as said ruthenium compound in the second loading step wherein M is at least one member selected from the group consisting of H, Li, Na, K and $NH_4$ and X is at least one member selected from the group consisting of Cl, Br, I and $NO_3$.

2. The method for producing an electrode catalyst for fuel cells according to claim 1, wherein said metal in said first loading step is at least one metal selected from the group consisting of Pt, Au, Ag, Ir, Os, Pd, Rh, Ru, Cu, Ni, Co, Fe, Mn, Cr, V, Ti, Mo, W, Ta, Bi and Sn.

3. The method for producing an electrode catalyst for fuel cells according to claim 1, wherein said electroconductive carbon support is at least one support selected from the group consisting of acetylene black, furnace black, channel black, activated carbon, graphite, carbon nanotubes, carbon nanofibers, and carbon nanocoils.

4. The method for producing an electrode catalyst for fuel cells according to claim 1, wherein said electroconductive carbon support has an average primary particle size of 10 to 200 nm.

5. The method for producing an electrode catalyst for fuel cells according to claim 1, wherein said metal nano-particles are formed on said electroconductive carbon support by chemically reducing a metal source in a liquid phase in the presence of carbon at a loading of less than 30% by mass.

6. The method for producing an electrode catalyst for fuel cells according to claim 1, wherein said metal nano-particles are formed on said electroconductive carbon support by impregnating carbon with a metal source at a loading of less than 30% by mass followed by chemical reduction in a gas phase.

7. The method for producing an electrode catalyst for fuel cells according to claim 1, wherein said metal nano-particles are formed on said electroconductive carbon support by loading metal colloid on carbon at a loading of less than 30% by mass.

8. The method for producing an electrode catalyst for fuel cells according to claim 1, wherein in said first loading step, a platinum compound and a reducing agent are added to a dispersion of said carbon support in water in a concentration of 0.01 to 2% by mass.

9. The method for producing an electrode catalyst for fuel cells according to claim 8, wherein said platinum compound in said first loading step is at least one compound selected from the group consisting of chloroplatinic acid salts, platinum(II) chloride, platinum(IV) chloride, dinitrodiamineplatinum(II), bisacetylacetonatoplatinum, dichlorotetramineplatinum, platinum tetraminesulfate, ammonium platinum(II) chloride, ammonium platinum(IV) chloride and dichlorodiamineplatinum.

10. The method for producing an electrode catalyst for fuel cells according to claim 8, wherein said reducing agent in said first loading step is at least one reducing agent selected from the group consisting of ethylene glycol, ethanol, methanol, n-propanol, i-propanol and butanol.

11. The method for producing an electrode catalyst for fuel cells according to claim 1, wherein said metals containing at least platinum and ruthenium is at least one metal selected from the group consisting of PtRu, PtRuSn, PtRuRh, PtRuPd, PtRuIr, PtRuAu, PtRuMo, PtRuW, PtRuCo, PtRuNi, PtRuFe, and PtRuCr.

12. The method for producing an electrode catalyst for fuel cells according to claim 1, wherein said metals containing at least platinum and ruthenium has an average particle size of up to 4 nm.

13. The method for producing an electrode catalyst for fuel cells according to claim 1, wherein said platinum compound in said second loading step is at least one platinum compound selected from the group consisting of chloroplatinic acid, platinum(II) chloride, platinum(IV) chloride, dinitrodiamineplatinum(II), bisacetylacetonatoplatinum, dichlorotetramineplatinum, platinum tetraminesulfate, ammonium platinum(II) chloride, ammonium platinum(IV) chloride, and dichlorodiamineplatinum.

14. The method for producing an electrode catalyst for fuel cells according to claim 1, wherein said ruthenium compound in said second loading step is at least one ruthenium compound selected from the group consisting of ruthenic acid chloride ($H_2RuCl_6$), lithium ruthenate chloride ($Li_2RuCl_6$), sodium ruthenate chloride ($Na_2RuCl_6$), potassium ruthenate chloride ($K_2RuCl_6$) and ammonium ruthenate chloride (($NH_4)_2RuCl_6$).

15. The method for producing an electrode catalyst for fuel cells according to claim 1, wherein second loading step is conducted at a temperature of from 40 to 120° C. for 1 to 10 hours.

16. The method for producing an electrode catalyst for fuel cells according to claim 1, wherein second loading step is conducted at a temperature of from 10 to 100° C. for 2 to 8 hours.

17. The method for producing an electrode catalyst for fuel cells according to claim 1, wherein a ratio of platinum metal to ruthenium metal in said metals containing at least platinum and ruthenium is from 2:8 to 9:1.

18. A method for producing an electrode catalyst for fuel cells, comprising a first loading step of forming metal nano-particles on an electroconductive carbon support, the metal nano-particles having a particle size of 0.1 to 2.0 nm and a controlled spacing therebetween, and a second loading step of growing metals comprising at least platinum and ruthenium from a solution comprising a platinum compound, a ruthenium compound and a reducing agent on the metal nano-particles as nuclei wherein $H_2RuCl_6$ is used as said ruthenium compound in the second loading step.

19. The method for producing an electrode catalyst for fuel cells according to claim 18, wherein said metal in said first loading step is at least one metal selected from the group consisting of Pt, Au, Ag, Ir, Os, Pd, Rh, Ru, Cu, Ni, Co, Fe, Mn, Cr, V, Ti, Mo, W, Ta, Bi and Sn.

* * * * *